United States Patent
Yamauchi et al.

(10) Patent No.: US 7,815,882 B2
(45) Date of Patent: Oct. 19, 2010

(54) METHOD AND APPARATUS FOR REFINING BORON-CONTAINING SILICON USING AN ELECTRON BEAM

(75) Inventors: Norichika Yamauchi, Ichihara (JP); Takehiko Shimada, Yokohama (JP); Masafumi Maeda, Niiza (JP)

(73) Assignee: IIS Materials Corporation, Ltd., Tokyo (JP)

( * ) Notice: Subject to any disclaimer, the term of this patent is extended or adjusted under 35 U.S.C. 154(b) by 654 days.

(21) Appl. No.: 11/233,470

(22) Filed: Sep. 23, 2005

(65) Prior Publication Data
US 2006/0123947 A1    Jun. 15, 2006

(30) Foreign Application Priority Data
Sep. 27, 2004    (JP) ............................. 2004-310215

(51) Int. Cl.
C01B 25/08    (2006.01)
(52) U.S. Cl. ..................................................... 423/289
(58) Field of Classification Search ....................... None
See application file for complete search history.

(56) References Cited

U.S. PATENT DOCUMENTS

| | | | | | |
|---|---|---|---|---|---|
| 4,462,806 | A | * | 7/1984 | Mahoney et al. | 23/293 R |
| 5,182,091 | A | * | 1/1993 | Yuge et al. | 423/348 |
| 5,534,314 | A | * | 7/1996 | Wadley et al. | 427/585 |
| 6,368,403 | B1 | * | 4/2002 | Schmid et al. | 117/79 |

* cited by examiner

*Primary Examiner*—Roy King
*Assistant Examiner*—Yoshitoshi Takeuchi
(74) *Attorney, Agent, or Firm*—Michael Tobias

(57) ABSTRACT

In a refining method for boron-containing silicon, boron-containing silicon is irradiated with an electron beam in a vacuum vessel to melt the boron-containing silicon. A boron compound-forming substance is introduced into the vacuum vessel, and boron contained in the molten silicon is formed into a boron compound. After at least a portion of the boron compound has vaporized, irradiation with the electron beam is stopped. The high-purity molten silicon can then be solidified.

11 Claims, 3 Drawing Sheets

METHOD AND APPARATUS FOR REFINING BORON-CONTAINING SILICON USING AN ELECTRON BEAM

BACKGROUND OF THE INVENTION

1. Technical Field

This invention relates to a method and apparatus for refining boron-containing silicon (such as scrap silicon containing boron as a dopant) using an electron beam which can obtain high-purity silicon for use in solar cells, semiconductors, or other devices.

2. Related Art

For the following reasons, it is difficult to remove boron contained in a silicon melt.

1. Boron has low activity, and removal thereof by vaporization is difficult (boron has a low vapor pressure, so simple vacuum removal cannot be performed).

2. The segregation coefficient of boron is close to 1, so solidification refining is not a viable method.

There have been a number of research reports pertaining to removal of boron from a silicon melt by slag treatment, plasma treatment, and treatment which is a combination of these two treatment methods. Examples of plasma treatment methods which have been proposed include treatment by a weakly oxidizing transferred arc plasma using carbon dioxide gas, treatment in which $O_2$ or $H_2O$ is added to a nontransferred arc plasma, treatment in which induction melting and a nontransferred arc plasma are combined and $H_2O$ is added to the plasma, and a method in which water vapor is added to a nontransferred argon arc plasma so as to remove boron. For example, Japanese Published Unexamined Patent Application Hei 10-245216 describes blowing a mixture of argon gas and water vapor at the surface of a melt of silicon which was melted using a plasma torch and oxidizing boron in the melt.

In these treatment methods which have been proposed in the past, boron is removed from a silicon melt by vaporizing a compound (a boron oxide) having a high vapor pressure which is formed by a reaction between boron and added $O_2$, $H_2O$, or other substance which is added to the melt. However, in these methods, due to the nature of the heating method used to heat the silicon, molten silicon in the silicon melt is violently stirred while reacting with the substance which is added to the melt, so silicon itself also ends up oxidizing. As a result, these methods have the problem that the yield of high-purity silicon obtained by refining ends up decreasing.

SUMMARY OF THE INVENTION

The present invention provides a method and apparatus for refining boron-containing silicon using an electron beam which can efficiently remove boron while suppressing the formation of silicon oxide.

In the electron beam melting method, which has been used for removal of impurities such as phosphorous having a high vapor pressure, electrons are accelerated at a high voltage and impacted with silicon, which is thereby heated and melted. The electron beam melting method has the advantage that the distribution of energy which is input to a material being heated can be freely varied by programming the scanning pattern of the electron beam, so the material being heated can be heated under optimal conditions.

However, the electron beam melting method requires heating in a high vacuum ($10^{-3}$ Pa). For this reason, it has been thought to be impossible to employ the electron beam melting method in the refining methods of the prior art involving the addition of water vapor or the like to a melt. As a result, there have been no reports of using the electron beam melting method for removal of boron from silicon.

The present inventors discovered in the course of experiments that contrary to common belief, it is in fact possible to add water vapor or other substance to a silicon melt being heated with an electron beam in a vacuum chamber, even at a high vacuum of around $10^{-3}$ Pa method, and that the substance which is added to the melt can effectively combine with boron in the melt to form a vaporizable boron compound which can then be vaporized and removed from the melt. The substance which is added to the melt to form a boron compound will be referred to below as a boron compound-forming substance.

Thus, according to one form of the present invention, a method of refining boron-containing silicon using an electron beam includes irradiating boron-containing silicon in a vacuum chamber with an electron beam and melting the boron-containing silicon, introducing into the vacuum chamber a boron compound-forming substance which bonds with boron in the molten silicon and forms a boron compound, and stopping irradiation with the electron beam after at least a portion of the boron compound has been vaporized.

The use of electron beam melting in a method according to the present invention enables heating with better energy efficiency than other heating methods such as plasma heating, and it does not contaminate silicon being heated. In additions in contrast to plasma melting, it can perform heating without imparting violent motion to a melt. The lack of violent motion makes it possible to minimize a decrease in the yield of high-purity silicon caused by oxidation of silicon.

The boron compound-forming substance can be any substance capable of combining with boron contained in a silicon melt to form a boron compound which can be vaporized from the melt. A preferred boron compound-forming substance is one which contains oxygen and which can combine with boron to form a boron oxide. From the standpoint of handling and costs, water vapor or a mixture of hydrogen gas and oxygen gas is particularly suitable for use as a boron compound-forming substance. However, boron compound-forming substances which do not contain oxygen can also be used, such as sulfur.

When a silicon melt containing boron is irradiated with an electron beam in the presence of a boron-forming compound such as $H_2O$, the amount of boron in the silicon melt monotonically decreases as irradiation continues. However, it was found from experiments that the boron concentration of the melt does not decrease monotonically. Instead, the boron concentration first decreases to a minimum value, and if irradiation is further continued, because silicon is being vaporized from the melt at the same time as a boron compound, the boron concentration then begins to increase from that minimum value due to the decrease in the amount of silicon in the melt. Thus, continuing irradiation beyond the point when a minimum boron concentration is achieved decreases the yield of high-purity silicon which is obtained. In order to optimize the yield of high-purity refined silicon, heating with an electron beam is preferably not carried out beyond the point at which the boron concentration becomes a minimum.

According to another form of the present invention, an apparatus for refining silicon comprises a vacuum chamber, a crucible which is provided in the vacuum chamber for melting boron-containing silicon, an electron gun which irradiates boron-containing silicon in the crucible with an electron beam and melts the boron-containing silicon, and an introducing mechanism which introduces a boron compound-forming substance into the vacuum chamber.

The refining apparatus preferably also includes a controller which operates the electron gun to melt boron-containing silicon in the crucible operates the introducing mechanism to introduce a prescribed amount of the boron compound-forming substance into the vacuum chamber, and then stops the operation of the electron gun after at least a portion of the boron compound has vaporized. The controller preferably stops the operation of the electron gun no later than when the boron content of the silicon melt has become a minimum and before it starts to again increase.

"Boron compound" as used herein includes not only neutral boron compounds but also active species such as ions or radicals. The term "oxidation" as used herein includes not only stoichiometric oxidation but also oxidation which forms non-stoichiometric compounds.

DESCRIPTION OF PREFERRED EMBODIMENTS

Below, an embodiment of an apparatus for refining boron-containing silicon using an electron beam according to the present invention and an embodiment of a refining method according to the present invention which can employ this apparatus will be described while referring to the accompanying drawings.

Figure 1:
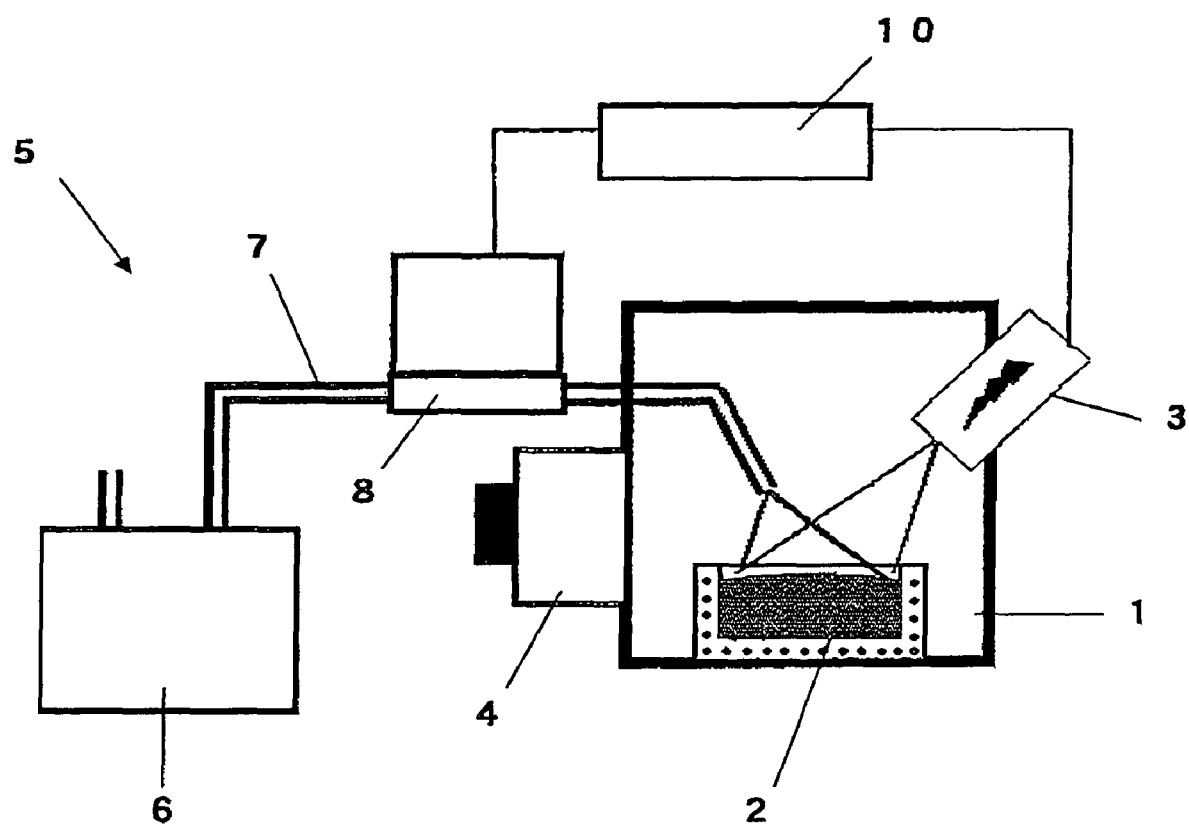
FIG. 1 is a schematic view showing the overall structure of an embodiment of a silicon refining apparatus according to the present invention.

As shown in FIG. 1, this embodiment of an apparatus for refining boron-containing silicon using an electron beam according to the present invention includes a vacuum vessel (a vacuum chamber) 1, a crucible 2 which is installed inside the vacuum vessel 1 and supplied with crushed pieces of scrap silicon containing boron (referred to below as "raw material silicon"), an electron gun 3 which irradiates the raw material silicon in the crucible 2 with an electron beam and melts it, an evacuation apparatus 4 which maintains a vacuum inside the vacuum vessel 1, and an $H_2O$ introducing system 5 which introduces $H_2O$ in the form of a mist, for example, into the vacuum vessel 1 as an oxygen-containing substance.

The $H_2O$ introducing system 5 comprises a water vapor generating apparatus 6, a water vapor supply pipe 7 which leads water vapor which is generated by the water vapor generating apparatus 6 into the vacuum vessel 1, and a mass flow controller 8 which is provided along the water vapor supply pipe 7. The mass flow controller 8 continuously or intermittently introduces water vapor into the vacuum vessel 1 in response to a command from a below-described controller 10 and controls the flow rate of water vapor introduced into the vacuum vessel 1. The temperature of the water vapor generated in the water vapor generating apparatus 6 is preferably at least 80° C., because water vapor or water having a temperature lower than 80° C. may excessively absorb heat from the silicon melt and adversely affect the purification process.

The controller 10 shown in FIG. 1 controls the refining process performed by the refining apparatus and may comprise any suitable mechanism, such as a sequence controller, a personal computer, or other electronic controller. The electron gun 3 and the mass flow controller 8 of the $H_2O$ introducing system 5 are connected to the controller 10 and are operated in accordance with commands from the controller 10. The controller 10 operates the electron gun 3 to melt raw material silicon in the crucible 2, and it operates the $H_2O$ introducing system 5 to introduce a prescribed amount of $H_2O$ into the vacuum vessel 1 and oxidize boron contained in the molten silicon to form it into a boron oxide and vaporize it. The controller 10 stops the operation of the electron gun 3 after at least portion of the boron oxide has evaporated.

Next, the operation of the embodiment of a refining apparatus according to the present invention shown in FIG. 1 will be described. An unillustrated cover of the vacuum vessel 1 is opened, and raw material silicon is placed into the crucible 2. The cover is then closed, and the evacuation apparatus 4 is operated to form a vacuum of around $10^{-3}$ Pa inside the vacuum vessel 1. Then, a start button connected to the controller 10 is pressed to start refining. As a result, the controller 10 operates the electron gun 3, and an electron beam irradiates the raw material silicon in the crucible 2 and melts it. The controller 10 operates the mass flow controller 8 of the $H_2O$ introducing system 5 immediately after the start of melting, and a prescribed amount of water vapor is supplied to the interior of the vacuum vessel 1, preferably intermittently. Convection of the silicon melt caused by heating produces gentle circulation of the silicon within the melt. When boron contained in the silicon melt is brought to the surface of the melt by the convection, the boron contacts the water vapor and is oxidized to form boron oxide.

When a prescribed amount of time has elapsed from the start of irradiation with the electron beam and preferably no later than when the boron concentration in the silicon melt has become a minimum, the controller 10 stops the operation of the electron gun 3, and the high-purity silicon melt in the crucible 2 is allowed to naturally cool and solidify. The molten silicon can be cooled while still in the crucible 2, or it can be first poured into a mold having a suitable shape and cooled within the mold to form an ingot, for example. If desired, the ingot or other shape can then be further processed by standard processing techniques to form monocrystalline silicon, for example.

Figure 2:
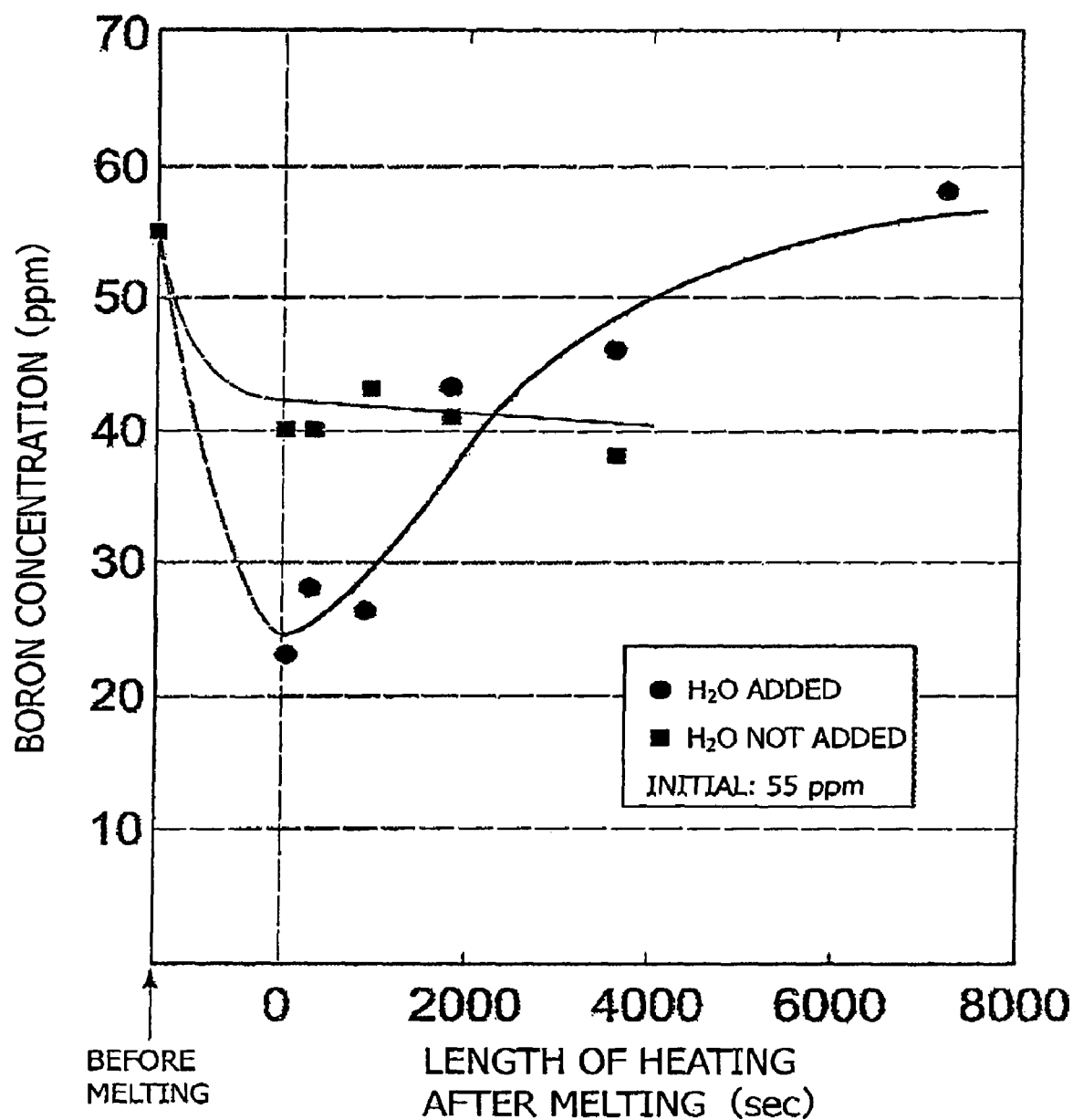
FIG. 2 is a graph showing the change in the boron concentration of a silicon melt with respect to the length of heating after melting in experiments performed for the case in which $H_2O$ was introduced into a vacuum chamber during melting of silicon and the case in which $H_2O$ was not introduced into the vacuum chamber.

FIG. 2 shows the change in the boron concentration in molten silicon with respect to length of heating after melting in experiments for the case in which $H_2O$ was introduced into a vacuum chamber during melting of the silicon in a crucible and for the case in which $H_2O$ was not introduced. The point along the horizontal axis at which the melting time is zero indicates the time at which all of the silicon in the crucible had completely melted. The initial boron concentration in the silicon at the start of the experiment (before melting) was 55 ppm. In the case in which $H_2O$ was not introduced into the vacuum chamber during melting, the boron concentration at the time of complete melting decreased only to 42 ppm. In contrast, in the case in which $H_2O$ was introduced into the vacuum chamber during melting, the boron concentration at the time of complete melting greatly decreased down to 25 ppm. However, in the case in which $H_2O$ was introduced, when melting was continued after the point of complete melting, the boron concentration of the melt again increased.

Figure 3:
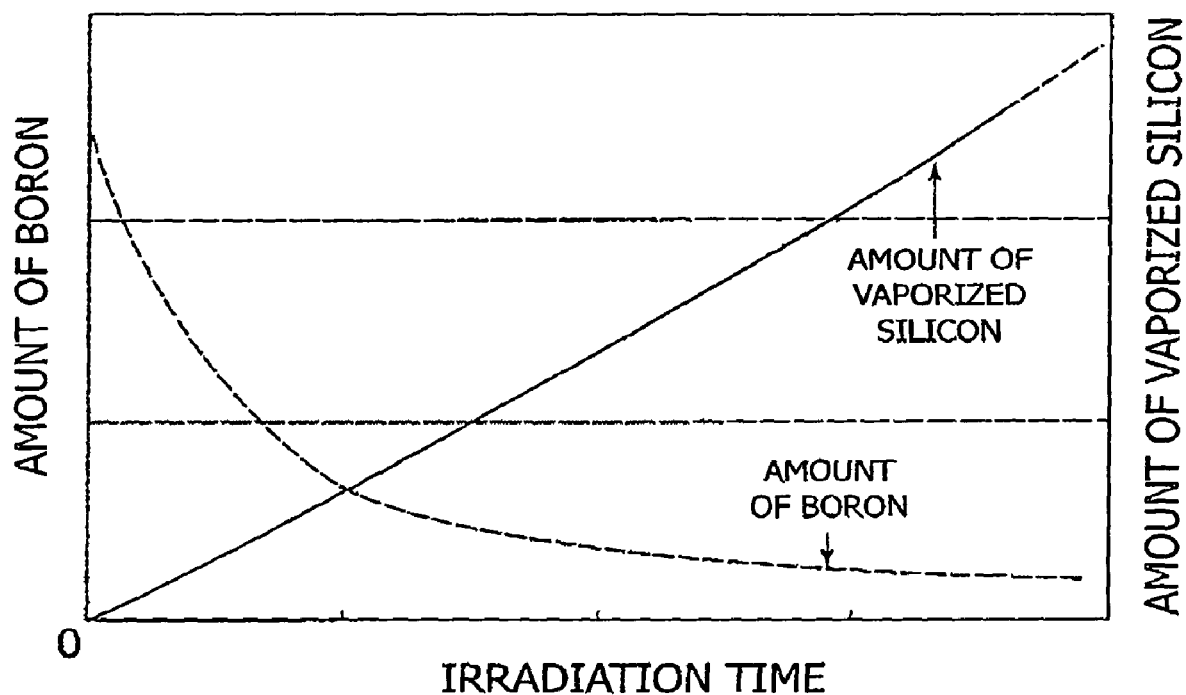
FIG. 3 is a graph showing the relationship of the amount of residual boron in a silicon melt and the amount of vaporized silicon to the length of irradiation of the silicon melt with an electron beam.

FIG. 3 is a graph showing the relationship of the amount of residual boron in a silicon melt and the amount of vaporized silicon to the length of irradiation of the silicon melt with the electron beam (namely, the melting time). As can be seen from this graph, the amount of boron in the silicon melt decreases as the irradiation time with the electron beam increases, but at the same time, the amount of vaporized silicon also increases. The increase in the amount of vaporized silicon results in the concentration of boron in the melt reaching a minimum and then increasing rather than monotonically decreasing.

The length of time from the start of heating until the boron concentration becomes a minimum can be determined experimentally by Carrying out a trial run using the refining apparatus under the same conditions as are to be used for actual refining and measuring the boron concentration in the silicon melt at various times. After the length of time is determined, actual refining can be carried out so as to terminate heating with the electron beam once this length of time has elapsed.

What is claimed is:

1. A method of refining boron-containing silicon using an electron beam comprising:
    irradiating boron-containing silicon in a vacuum chamber with an electron beam and melting the boron-containing silicon with the electron beam without performing plasma heating to form molten silicon;
    introducing into the vacuum chamber a boron compound-forming substance which bonds with boron in the molten silicon and forms a boron compound; and
    stopping the irradiation with the electron beam after at least a portion of the boron compound has vaporized.

2. A method as claimed in claim 1 wherein irradiation with the electron beam is stopped no later than when the boron concentration of the molten silicon has become a minimum.

3. A method as claimed in claim 1 wherein the boron compound-forming substance is an oxygen-containing substance which oxidizes boron contained in the molten silicon and changes it into a boron oxide.

4. A method as claimed in claim 3 wherein the oxygen-containing substance is selected from $H_2O$ and a mixture of hydrogen gas and oxygen gas.

5. A method as claimed in claim 1 including previously performing a trial run to determine the length of time for the boron concentration of molten silicon to reach a minimum, wherein stopping the irradiation with the electron beam is performed upon the passage of a length of time no greater than the length of time determined in the trial run.

6. A method as claimed in claim 1 comprising introducing water vapor into the vacuum chamber as the boron compound-forming substance.

7. A method as claimed in claim 6 including introducing the water vapor into the vacuum chamber with the water vapor at a temperature of at least 80° C.

8. A method as claimed in claim 1 including introducing the boron compound-forming substance into the vacuum chamber while melting the boron-containing silicon with the electron beam.

9. A method as claimed in claim 1 including stopping irradiation with the electron beam no later than when the silicon is completely melted by the electron beam.

10. A method as claimed in claim 1 including irradiating the boron-containing silicon with the electron beam using an electron gun.

11. A method as claimed in claim 1 including creating a vacuum of approximately $10^{-3}$ Pa within the vacuum chamber.

* * * * *